(No Model.)

H. T. MOODY.
FUSIBLE JOINT.

No. 563,394. Patented July 7, 1896.

WITNESSES

INVENTOR
Henry T. Moody

UNITED STATES PATENT OFFICE.

HENRY T. MOODY, OF NEWBURYPORT, MASSACHUSETTS, ASSIGNOR TO THE VICTOR MANUFACTURING COMPANY, OF SAME PLACE.

FUSIBLE JOINT.

SPECIFICATION forming part of Letters Patent No. 563,394, dated July 7, 1896.

Application filed June 13, 1895. Serial No. 552,674. (No model.)

*To all whom it may concern:*

Be it known that I, HENRY T. MOODY, a citizen of the United States, residing at Newburyport, in the county of Essex and State of Massachusetts, have invented a new and useful Improvement in Fusible Joints, of which the following is a full, clear, and exact description, reference being had to the accompanying drawings, forming a part of this specification, in explaining its nature.

My invention relates to that kind of fusible joint where two links are soldered together, the action of heat melting the solder and allowing the links to separate, and especially to a certain construction of one of the links whereby the strain is taken from the solder, so that there is no danger of the links being separated except by the action of heat.

Figure 1:
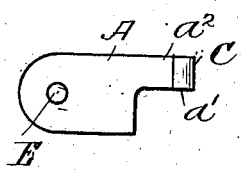
Figure 2:
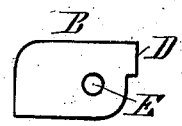
Figure 3:
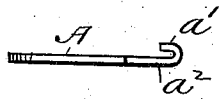
Figure 4:
Figure 5:
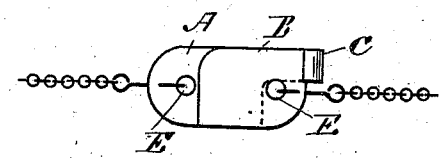
Figure 9:
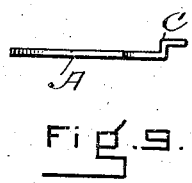
Figure 6:
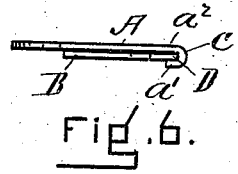
Figure 7:
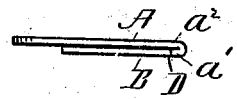
Figure 8:
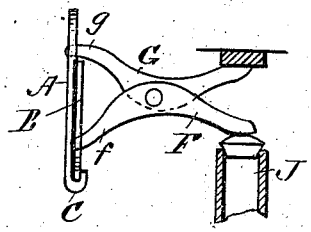

In the drawings, Figure 1 represents a view in plan of one of the links, showing the details of my construction. Fig. 2 is a similar view of the other link. Fig. 3 is a side view of the link represented in Fig. 1. Fig. 4 is a similar view of the link represented in Fig. 2. Fig. 5 shows the links united together by solder. Fig. 6 is a side view of the two links when soldered together. Fig. 7 shows two links soldered together, the construction being slightly different from that shown in Fig. 6. Fig. 8 represents a method of attachment of my links in a case where the strain to be resisted is a compressed strain. Fig. 9 shows a modified form of one of the links, to which reference is hereinafter made.

A represents a link having the shoulder C, which is adapted to cover over the end D of the link B when the two are soldered together, as shown in Fig. 5. The shoulder C is made, as shown in Fig. 3, by turning back the projection $a^2$ of the link A on itself, and thus forming the lip $a'$, which is preferably made parallel to and at a short distance from the projection $a^2$. Another form of the shoulder C is shown in Fig. 7, where the lip $a'$ is placed close to the projection $a^2$, leaving no space between. In each of the links A B there are holes E, to which may be attached, for instance, two ends of a chain holding open a door, as shown in Fig. 5.

The shoulder C is of great service in taking the strain from the solder, and when made in form shown in Figs. 3 and 6 also serves to keep the links close together, and thus reinforces the solder as a means of connection between the links. This is not the case when the shoulder is made as shown in Fig. 7, and I prefer this construction. Another way of reaching this result is shown in Fig. 9, where the shoulder C is formed by the depression of one portion of the link A in relation to another, or by striking out the part which forms the shoulder, so as to form what might be termed a "bend." This construction permits the two parts of the link to separate in two ways when the solder is melted.

When it is desired to oppose the fusible joint to a force which tends to push the links toward each other rather than to draw them apart, the joint may be attached in the manner shown in Fig. 8 by a combination of two curved levers F G, pivoted to each other at H. The ends $f$ $g$ of the levers are received in the slots E of the links, and when the solder connecting the links is melted the ends of the levers will no longer be engaged with the slots, but will be pushed apart by the force of water in the pipe J. I have shown this method of attachment merely as an instance of one manner of adapting my fusible joint; but I would not be understood as limiting myself to this method of attachment.

It will be seen that my fusible joint can be very cheaply and easily made and at the same time that it will be very serviceable. The simplicity of its manufacture is thought to be a decided improvement over similar articles which have been used before.

Having thus fully described my invention, I claim and desire to secure by Letters Patent of the United States—

1. In a fusible joint, the combination of two links adapted to be placed face to face, one having a narrow shoulder at one end, against which the edge of the companion link bears, and the links being arranged to extend by each other, each link having a hole which is out of line with a median line drawn through the shoulder lengthwise the portions of the link in line therewith, and which holes connect the joint with a fire-door or other apparatus, all as and for the purposes described.

2. In a fusible link, the combination of the link A formed as described, and having the shoulder C at one end and the hole E at the other end, out of line with a median line drawn lengthwise the link through the center of said shoulder, the link B formed as described, having the edge D at one end arranged to rest against the shoulder C and the hole E at the same end but out of the median line of the edge which bears against said shoulder, the two links being held one to the other, as specified, and adapted to be separated as indicated.

HENRY T. MOODY.

In presence of—
JOHN C. CURRIER,
C. K. DALRYMPLE.